Oct. 4, 1960    B. H. KRYZER ET AL    2,954,799
CONTROL FOR WATER SOFTENERS

Filed May 24, 1955    2 Sheets-Sheet 1

INVENTORS
BENJAMIN H. KRYZER
THOMAS W. TECHLER
BY
ATTORNEY

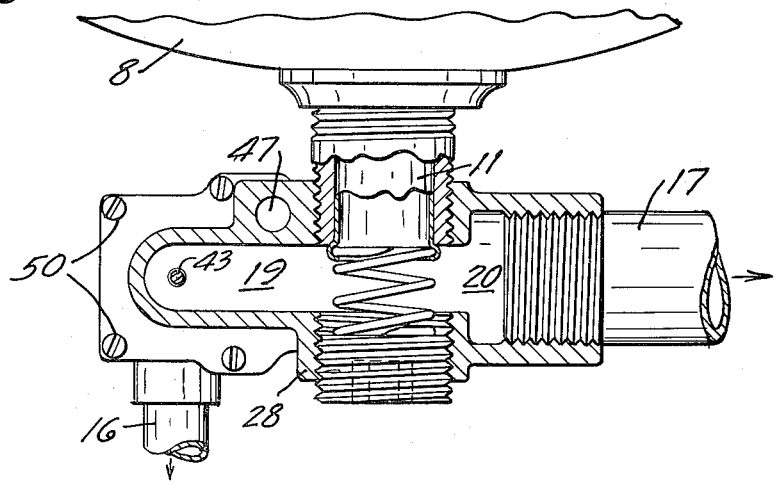
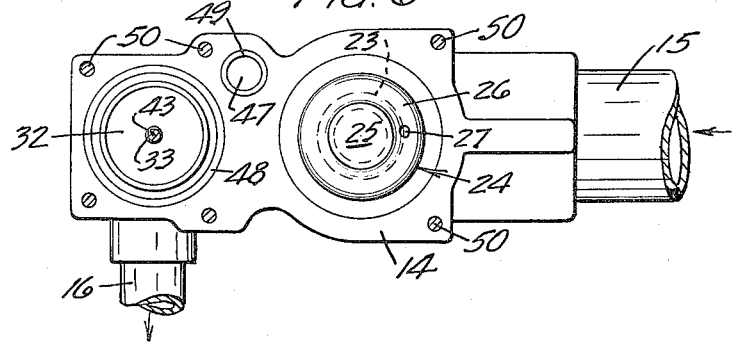
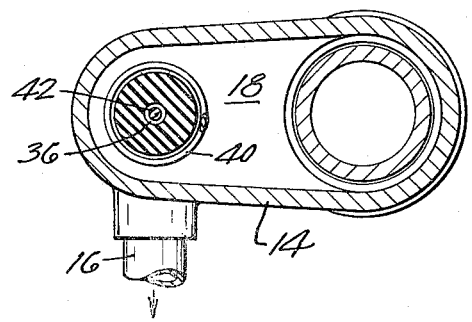

United States Patent Office 2,954,799
Patented Oct. 4, 1960

2,954,799

CONTROL FOR WATER SOFTENERS

Benjamin H. Kryzer and Thomas W. Techler, St. Paul, Minn., assignors, by mesne assignments, to Union Tank Car Company, Chicago, Ill., a corporation of New Jersey Filed May 24, 1955, Ser. No. 510,674

10 Claims. (Cl. 137—599.1)

This invention relates to controls for water softeners requiring periodic regeneration, and particularly to improved semi-automatic controls adapted to be set to determine the duration and sequence of the several treatment steps required for reconditioning the body of softening material.

It is an object of our invention to provide a control of the class described which is particularly although not exclusively adapted for the control of water softeners of the up-flow type wherein efficient use of solid regenerating material requires that special provision be made for settling or compacting the body of softening material prior to the charging of the softener tank with such regenerating material.

Another object is to provide in a control of the class described a single manual control comprising a rotary knob having a pointer which, by reference to the dial of the time control mechanism, is operative to start the several treatment steps required for efficient regeneration of the softener.

A particular object is to provide for softeners of the class described improved control valve mechanism including a diaphragm valve and a single, three-position plunger valve which is operatively connected to time control mechanism adapted to be manually set to predetermine the duration of the several periods of treatment required for efficient regeneration of the body of softening material.

A further and particular object is to provide for water softeners improved valve mechanism including a fluid pressure responsive valve and an easily movable plunger valve controlling the operation of the pressure responsive valve and also controlling the direction of flow through the softener in combination with a timer having a manual starting control and a cam disposed to actuate the plunger valve and operatively connected to the timer and manual control.

Our invention also includes certain other novel features of construction which will be more fully pointed out in the following specification and claims.

Referring to the accompanying drawings which illustrate, by way of example and not for the purpose of limitation, a preferred embodiment of our invention:

Figure 2:
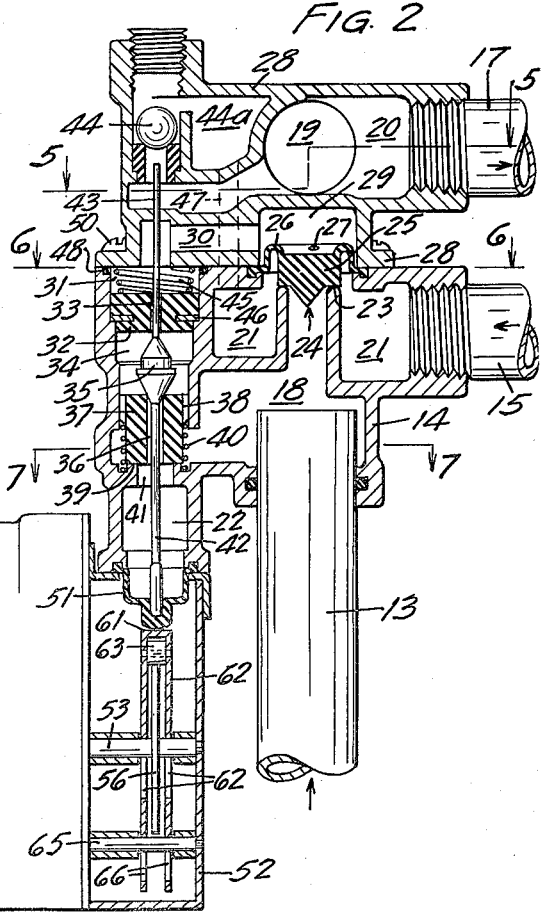
Fig. 2 is a part side elevational view and part vertical sectional view showing our improved control.
Figure 4:
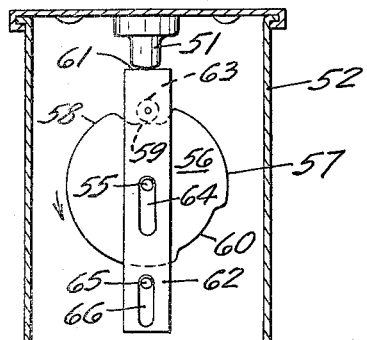

Fig. 4 is a part elevational view and part sectional view showing the cam housing and cam mechanism for operating the plunger valve, and Figs. 5, 6 and 7 are horizontal sectional views taken respectively on the lines 5—5, 6—6 and 7—7 of Fig. 2.

Figure 1:
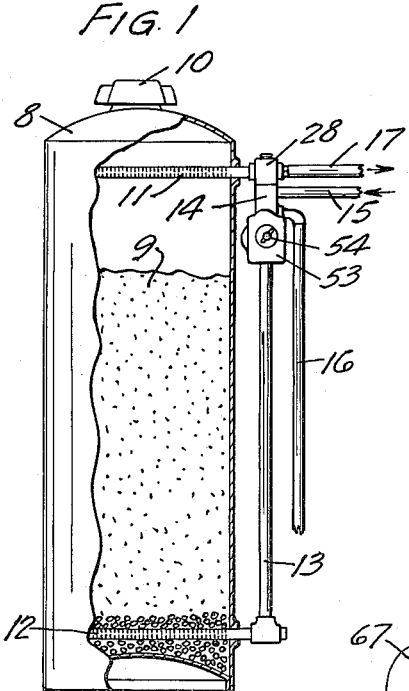
Figure 1 is a part side elevational view and part vertical sectional view through a water softener having one of our improved controls.

As shown in Fig. 1, our improved control may be operatively connected to a water softener of the conventional type having a tank 8 containing a body of granular or particulate softening material 9. A cap 10 closes an opening in the top of the tank and is removable to permit solid particles or pellets of common salt or other suitable regenerating material to be charged into the tank. Extending into the upper portion of the tank is a distributor 11 and another distributor 12 extends into the lower portion of the tank. From the distributor 12 a pipe 13 rises to our control housing, indicated generaly by the numeral 14. This housing is supplied with hard water under pressure through a pipe 15 and is connected to the distributor 11, to a drain or waste pipe 16 and to a soft water outlet or service pipe 17.

The housing 14 is formed with a first chamber 18 communicating with the lower portion of the tank 8 through the riser pipe 13 and distributor 12, constituting a tank inlet, and a second chamber 19 communicating with the upper portion of the tank through the distributor 11, constituting a tank outlet. The chamber 19 is in continuous communication with a service outlet chamber 20 for supplying the service pipe 17. There is also an inlet chamber 21 which is supplied with hard water from the pipe 15 and a waste chamber 22 in continuous communication with the waste pipe 16.

A pressure responsive diaphragm valve indicated generally by the numeral 24 is arranged to be actuated to and from an annular seat 23 to control direct communication between the chambers 18 and 21. This valve has a solid central member 25 and a flexible peripheral portion 26 formed with a perforation 27 permitting gradual flow from one side of the valve to the other side. The flexible portion 26 has its outer margin secured in an annular groove in the main part of the housing 14 and held under compression by a member 28 of the housing. This member is formed with a chamber 29 directly above the valve 24 and a passage 30 extending to a chamber 31 directly above a substantially cylindrical valve seat member 32. Extending through this seat member is a restricted passage 33 communicating at its lower end with a chamber 34 containing a plunger valve indicated generally by the numeral 35. A second restricted passage 36 extends downward from the chamber 34 through a second cylindrical valve member 37. Valve members 32 and 37 are preferably constructed from resilient compressible material.

At its lower end the passage 36 communicates with the waste chamber 22 which is in continuous communication with a waste outlet pipe 16 (Figs. 1 and 7). The upper portion of the outer periphery of the member 37 is formed with ribs which space the member from the wall of the housing and afford a substantially annular passage 38 connecting the chamber 34 with the chamber 18. The valve member 37 is biased toward an open position in relation to an annular seat 39 by a coiled spring 40 engaging the lower ends of the ribs on this member. Thus when fluid pressure in the chamber 34 is low enough the valve member 37 is raised from the seat 39 to permit rapid flow from the chamber 18 through a passage 41 communicating with the waste chamber 22.

The valve 35 is formed at its upper side with a conical head adapted to close the passage 33 when the valve is in an elevated position and at its lower side with a conical head adapted to close the passage 36 when the valve is in a lowered position. Depending from the valve 35 is an actuating stem 42 extending through the passages 36 and 41 into the chamber 22. At the upper side of the valve 35 an integral pin 43 extends upwardly through the passage 33 and through a bearing in the member 28 to actuate a ball check valve 44. Normally this check valve closes the communication between a chamber 44a and the chamber 19.

Valve seat member 32 is mounted for limited vertical movement in chamber 31 and is biased downward by a coiled spring 45 engaging its upper surface and confined in the chamber. This seat member is preferably constructed from a medium soft rubber or rubber-like composition and is provided with an annular stop member 46 embedded in the body of the member and normally resting on a shoulder formed in the bore of the housing. The chamber 44a is in continuous communication with the chamber 21 through a passage 47.

As best shown in Figs. 2 and 6, an O ring 48 is employed to seal the passage into the upper housing member 28 around the chamber 31 and a similar but smaller ring 49 is provided to seal the passage 47 at the junction of the upper and lower housing members. The periphery of the diaphragm valve 24 fits in an annular groove in the housing member 14 and is held under compression when the housing members are assembled. Bolts 50 may be employed to connect the housing members together and retain the several sealing members under compression.

A flexible elastic cap 51 affords a closure for the lower side of the waste chamber 22 and also affords means for actuating the stem 42 of the valve 35. The cap 51 projects downward into a cam housing 52 which is detachably connected to the housing member 14 and supports a casing 53 containing time control mechanism. This mechanism is more fully described in our application for patent serial No. 491,452, filed March 1, 1955, now abandoned, and forms no part of the present invention. It is preferably of the spring actuated clock type having a manual control knob 54 fixed on the arbor of the clock mechanism.

The clock arbor has an extension shaft 55 contained in the cam housing 52 and fixed on the shaft 55 is a cam indicated generally by the numeral 56. This cam has peripheral segments 57, 58, 59 and 60 of which the segments 57 and 58 are of equal maximum radius. The segment 59 is of the shortest radius and the segment 60 has a radius which is intermediate between that of the segments 57 and 59. This cam is arranged to actuate a valve lift 61 which is supported in engagement with the lower end of the cap 51 and is integral with parallel lift arms 62 extending across opposite faces of the cam 56. Mounted between the lift arms 62 is a follower roller 63 which is held in contact with the upper periphery of the cam 56 by the elastic cap 51. The lift and roller 63 are movable vertically and are guided by sliding engagement of the shaft 55 in elongated slots 64 in the arms 62 and by a guide pin 65 extending in parallel relation to the shaft 55 below the cam and engaging the arms 60 in guide slots 66 therein.

Figure 3:
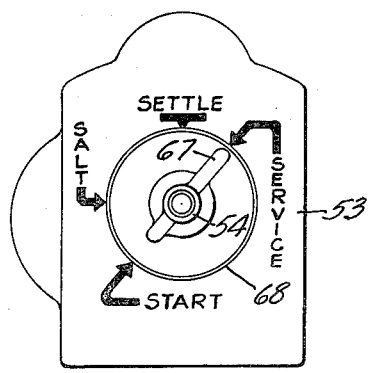
Fig. 3 is a front elevational view showing the manual control and dial associated therewith.

As shown in Fig. 3, the manual control knob 54 is provided with an indicator hand 67 which, by reference to a dial 68, indicates the position of the cam 56 in relation to the valve actuating mechanism. Associated with the dial 68 are suitable legends indicating the positions for the hand 67 at the start of the settling, salting and regenerating operations and during the service or normal water softening operation. The dial arrangement shown in Fig. 3 is adapted for use with clock mechanism of the conventional type wherein there is a friction drive connection between the main spring and shaft upon which the knob 54 is fixed. Thus this knob may be turned in either clockwise or counter-clockwise direction independently of the clock mechanism and the pointer 67 may be set at selected positions in relation to the dial. The clock mechanism is stopped when the pointer is either in the service position or in the salt position and turns the knob and pointer counter-clockwise from either the "settle" position or "start" position for regeneration.

*Operation*

Figs. 2, 3 and 4 show our plunger valve, manual control and cam mechanism in position for service or water softening operation. During such operation the valve 24 is free to move to open position in relation to its seat 23 by reason of the fact that pressure in the chamber 29 above the valve is relieved by escape of fluid through the passage 33 to the chamber 34 and thence through the passage 38 to the chamber 18. Hard water from the supply pipe 15 flows from the chamber 21 past the valve 24 to the chamber 18, thence through the pipe 13 and distributor 12 into the lower portion of the water softening tank. The flow is upward through the softening material 9 and the soft water is discharged through the distributor 11, chambers 19 and 20 and service pipe 17.

High capacity ion exchange materials in present use for water softening have such low specific gravity that the spheroidal particles of the material are caused to disperse in a greatly expanded mass when subjected to rising currents of water in the tank. Thus the up-flow softening operation causes the body of softening material to expand and to remain in an expanded, loose condition for a substantial period of time after the upward flow for water softening purposes has ceased. If it were attempted to deposit a load of salt on the body of softening material while in the expanded condition, much of the salt would settle through and into the body with resulting poor efficiency in the succeeding regenerating operation. In order to prevent such loss of efficiency, we provide for forcibly settling or compacting the body of water softening material 9 as a preliminary to the regenerating treatment.

When the apparatus requires regeneration, the operator turns the knob 54 clockwise to bring the pointer 67 to the "settle" position indicated in Fig. 3. This turns the cam 56 to a position where the follower roller 63 rests on the segment 57 near one end thereof. The actuating pin 42 for the valve 35 is thereby forced upwardly to a position in which the pin 43 unseats the valve 44, the passage 33 is closed by the valve 35 and the passage 36 is open. Upon the closing of the passage 33 fluid from the intake chamber 21 flows through the aperture 27 in the valve 24 and builds up pressure in the chamber 29 sufficient to cause the valve 24 to close, thereby cutting off direct communication between the chamber 21 and chamber 18. Water from the chamber 21 now flows through the passage 47 and chamber 44a past the open valve 44 to the chamber 19 and thence into the upper portion of the tank 8 through the distributor 11. Downward flow through the softening material 9 is thus established while water is discharged from the bottom of the tank 8 through the distributor 12, riser pipe 13, chamber 18, passage 38, chamber 34, passage 36, chamber 22 and waste pipe 16. This flow continues while the clock mechanism turns the cam 56 through an angle corresponding to the length of the segment 57, whereupon the follower roller 61 moves downward to rest on the segment 60. At this point the clock is stopped by suitable mechanism, e.g., by a cam actuated brake such as that described in our application for patent Serial No. 491,452, filed March 1, 1955, now abandoned.

This corresponds to the salt position indicated in Fig. 3 and causes the valve 35 to move to its intermediate position wherein the check valve 44 is closed on its seat, the passage 33 remains closed and the passage 36 remains open. The diaphragm valve 24 is also retained in its closed position wherein it cuts off direct flow from the inlet chamber 21 to the chamber 18. Since the check valve 44 is closed, flow is also cut off from the chamber 44a to the upper portion of the tank through chamber 19 and to the service pipe 17.

When the valve 35 is in its highest position the seat member 32 is moved upwardly in the chamber 31 against the bias of the spring 45 and upon movement of this valve to its intermediate or "salting" position the seat member 32 is moved down by the spring to retain the passage 33 in closed relation to the upper conical head of the valve 35. As a further result of the movement of the valve 35 to its intermediate position flow through the passage 36 to waste releases pressure in the chamber 34 and permits the spring 40 to raise the valve member 37 to open position in relation to the larger passage 41. Thereupon there is a rapid flow from the lower portion of the tank to the waste outlet, thereby quickly providing space in the upper portion of the tank for a charge of solid regenerating material. With the clock stopped in the "salt" position the operator removes the cap 10, pours in a charge of solid regenerating material on top of the compacted body of softening material 9 and closes the cap.

To start the regenerating operation, the operator merely turns the pointer 67 to the "start" position indicated in Fig. 3 thereby starting the clock mechanism and turning the cam 56 to a position in which the follower roller 63 rests on the leading end portion of the segment 58. This again raises the valve 35 to its highest position in which the pin 43 holds the check valve 44 in open relation to its seat, the passage 33 is closed and the passage 36 is open. Also during regeneration, the valve 24 is held closed on its seat by fluid pressure in the chamber 29, as hereinbefore described. Direct flow from the hard water inlet chamber 21 to the chamber 18 is thus cut off and flow is established from the chamber 21 through the passage 47, chamber 44a, past the valve 44, through the chamber 19 and distributor 11 to the upper portion of the tank. The regenerating salt on the upper surface of the softening material 9 is thus dissolved and the brine is caused to flow downwardly through this material while the spent brine is carried out through the distributor 12, pipe 13, chamber 18, passage 38, chamber 34, passage 36, waste chamber 22 and pipe 16. The clock mechanism turns the shaft 55 carrying the cam 56 in a counter-clockwise direction (Figs. 3 and 4) from the "start" position to the "service" position. Rotation of the shaft 55 is stopped when the cam reaches the "service" position wherein the follower roller 63 drops to the segment 59.

During regeneration the rate of flow to waste is determined by the size of the passage 36. Drain down at a much higher rate in preparation for salting is permitted by our valve member 37 which opens the much larger passage 41 to waste when downward pressure on this member is released by the opening of the passage 36 accompanied by the cut off of the flow of water to the control housing. Another feature of our control is the valve seat member 32 which is movable to coact with the valve 35 in retaining the passage 33 and diaphragm valve 24 closed at all times except during the water softening service operation.

It will be evident that our improved control embodies other advantageous features of construction which greatly facilitate efficient and economical operation in the hands of unskilled operators. By providing a single manual control comprising a pointer adapted to be set in the several operative positions indicated by legends on the dial, we facilitate efficient use of the apparatus by unskilled operators and improve the apparatus for domestic use. A minimum of power is required from the time control mechanism as a result of our provision of a cam operated, easily movable plunger valve and pressure responsive main valve under control of the plunger valve.

We claim:
1. Valve mechanism comprising, valve housing means having an inlet port, an outlet port, a first chamber connected to said inlet port, a second chamber connected to said outlet port, a supply chamber, a service outlet chamber and a waste chamber; the improvements which comprise, a pressure responsive valve controlling the flow from said supply chamber to said first chamber, said valve being movable in response to differences in pressure on opposite sides thereof, a first passage extending from said supply chamber to said second chamber; a second passage extending from said first chamber to said waste chamber, a third passage extending from one side of said pressure responsive valve to said first chamber, a fourth relatively restricted passage extending from supply chamber to said third passage, and a second valve movable selectively to any of three positions for controlling the flow through said first, second and third passages, said fourth passage being continuously open for supplying fluid under pressure to said one side of the pressure responsive valve whereby said pressure responsive valve is held in closed position when said third passage is closed and said second passage is open.

2. Valve mechanism in accordance with claim 1 wherein said second valve has oppositely disposed apertured seats and a plunger movable from one of said seats to the other and adapted in one position to cause the closing of said first and second passages and to open said third passage and in a second position to cause the closing of said third passage and the opening of said first and second passages.

3. Valve mechanism in accordance with claim 1 wherein said second valve has oppositely disposed apertured seats and a plunger movable from one of said seats to the other, one of said seats being movable longitudinally relative to the plunger, means for biasing said movable seat toward closed position in relation to the plunger, the plunger being movable to a first position to cause the closing of said first and second passages and to open said third passage, to a second position to cause the closing of said third passage and the opening of said first and second passages, and to a third position to cause the closing of said first passage, the closing of said third passage at said movable seat and the opening of the second passage at the other apertured seat.

4. Valve mechanism in accordance with claim 1 wherein said second valve comprises a plunger having oppositely disposed surfaces adapted to close said second and third passages respectively, a valve member adapted to close said first passage and a member projecting from said plunger for actuating said valve member to open said first passage.

5. Valve mechanism in accordance with claim 1 wherein said second valve comprises a plunger having oppositely disposed surfaces adapted to close the second and third passages respectively, a check valve member adapted to be held in closed position with respect to said first passage by fluid pressure, and a member projecting from said plunger for actuating said check valve member to open said first passage.

6. Valve mechanism in accordance with claim 1 wherein said third passage has a restriction defined by a seat member which is movable in the housing, said second valve having a plunger formed to close said passage, said seat member being movable to a plurality of positions, with the plunger in closed relation to said seat member, and resilient means for actuating said seat member toward closed relation with said plunger.

7. Valve mechanism in accordance with claim 1 wherein said second valve has first and second oppositely disposed apertured seat members, said second seat member comprising a body which is movable to and from a third seat and formed with a restricted central flow passage extending through said body, the housing being formed with a relatively large flow passage to the waste chamber adapted to be closed by said movable body, said second valve being movable to a first position in open relation to the first seat member and closed relation to the central passage in said movable body, said body being movable by fluid pressure on one side to close at said third seat, means for biasing said body to open the passage past said third seat when the valve is in a second position, said third passage including the aperture in said first seat member and said second passage including said central flow passage through said movable body, and means for actuating said movable valve member to a second position to close said third passage at the first seat and establish communication between said first chamber and the waste chamber either at the rate established by flow through the central passage in said movable body or at the rate established by flow past said body and third seat.

8. Valve mechanism comprising, valve housing means having an inlet port, an outlet port, a first chamber connected to said inlet port, a second chamber connected to said outlet port, a supply chamber, a service outlet chamber and a waste chamber, the improvements which comprise a pressure responsive valve controlling the flow from said supply chamber to said first chamber, said valve being movable in response to differences in pressure on opposite sides thereof, a first passage extending from said supply chamber to said second chamber, a second passage extending from said first chamber to said waste chamber, a third passage comprising a branch of said second passage extending from one side of said pressure responsive valve to said first chamber, a fourth relatively restricted passage extending from said supply chamber to said third passage, a second valve comprising a plunger movable selectively to any of three positions for controlling the flow through said first, second and third passages, said fourth passage being continuously open for supplying fluid under pressure to said one side of the pressure responsive valve whereby said pressure responsive valve is held in closed position when said third passage is closed and said second passage is open, and manually operable cam means for actuating said second valve selectively to any of said three positions.

9. Valve mechanism in accordance with claim 8 having time control means, whereby said cam means may be rotated automatically from selected positions operatively connected to said cam means.

10. Valve mechanism in accordance with claim 8 in which said second valve is movable to a first position, closing said first and second passages and opening said third passage; to a second position closing said third passage and opening the first and second passages, and to a third position closing said first and third passages and opening said second passage, said pressure responsive valve being held in closed position when said second valve is in either of said second or third positions.

References Cited in the file of this patent

UNITED STATES PATENTS

| | | |
|---|---|---|
| 2,630,325 | Reynolds | Mar. 3, 1953 |
| 2,636,560 | Rogers | Apr. 28, 1953 |
| 2,670,328 | Webb | Feb. 23, 1954 |
| 2,808,882 | Aukerman | Oct. 8, 1957 |